US012588050B2

(12) United States Patent
Zhang et al.

(10) Patent No.: US 12,588,050 B2
(45) Date of Patent: Mar. 24, 2026

(54) METHOD FOR USING UNLICENSED SPECTRUM AND APPARATUS

(71) Applicant: HUAWEI TECHNOLOGIES CO., LTD., Shenzhen (CN)

(72) Inventors: Liwen Zhang, Shanghai (CN); Zhou Xu, Madrid (ES); Xu Wang, Shanghai (CN); Liangliang Li, Madrid (ES)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 18/191,405

(22) Filed: Mar. 28, 2023

(65) Prior Publication Data

US 2023/0239912 A1 Jul. 27, 2023

Related U.S. Application Data

(63) Continuation of application No. PCT/CN2020/119114, filed on Sep. 29, 2020.

(51) Int. Cl.
*H04W 72/542* (2023.01)
*H04W 72/0453* (2023.01)
*H04B 17/309* (2015.01)

(52) U.S. Cl.
CPC ..... *H04W 72/542* (2023.01); *H04W 72/0453* (2013.01); *H04B 17/309* (2015.01)

(58) Field of Classification Search
CPC ............ H04W 72/542; H04W 72/0453; H04B 17/309
See application file for complete search history.

(56) References Cited

U.S. PATENT DOCUMENTS

| 2015/0063148 A1* | 3/2015 | Sadek | H04W 24/08 |
| | | | 370/252 |
| 2015/0063150 A1* | 3/2015 | Sadek | H04W 24/10 |
| | | | 370/252 |

(Continued)

FOREIGN PATENT DOCUMENTS

| CN | 109379703 A | 2/2019 |
| CN | 109600211 A | 4/2019 |

(Continued)

OTHER PUBLICATIONS

Samsung, "SUL Operating over NR-U," 3GPP TSG-RAN WG2 Meeting #109-e, R2-2001422, Online, Feb. 24-Mar. 6, 2020, 3 pages.

(Continued)

*Primary Examiner* — Ayaz R Sheikh
(74) *Attorney, Agent, or Firm* — Fish & Richardson P.C.

(57) ABSTRACT

This application relates to the field of communication technologies and discloses methods and apparatuses for using an unlicensed spectrum. An example method includes: obtaining information about a target unlicensed frequency band, and transmitting, based on the information about the target unlicensed frequency band, a signal on a supplementary uplink (SUL), where a spectrum of the SUL includes the target unlicensed frequency band. The information about the target unlicensed frequency band includes one or more of the following information: reference signal received power (RSRP), reference signal received quality (RSRQ), and a signal to interference plus noise ratio (SINR).

16 Claims, 6 Drawing Sheets

(56) References Cited

U.S. PATENT DOCUMENTS

| | | | | |
|---|---|---|---|---|
| 2016/0066204 A1* | 3/2016 | Khawer | ............. | H04W 72/542 455/500 |
| 2016/0227427 A1* | 8/2016 | Vajapeyam | ........... | H04L 5/0048 |
| 2017/0238320 A1* | 8/2017 | Fukuta | ............. | H04W 72/0453 370/329 |
| 2020/0053799 A1* | 2/2020 | Jeon | ..................... | H04L 5/0048 |

FOREIGN PATENT DOCUMENTS

| | | | |
|---|---|---|---|
| CN | 111225410 | A | 6/2020 |
| JP | 2016192683 | A | 11/2016 |
| JP | 2020078035 | A | 5/2020 |
| KR | 20190129660 | A | 11/2019 |
| WO | 2016009480 | A1 | 1/2016 |
| WO | 2020092054 | A1 | 5/2020 |

OTHER PUBLICATIONS

3GPP TS 38.101-1 V16.4.0, "3rd Generation Partnership Project; Technical Specification Group Radio Access Network; NR; User Equipment (UE) radio transmission and reception; Part 1: Range 1 Standalone (Release 16)," Jun. 2020, 406 pages.

3GPP TS 38.331 V16.1.0, "3rd Generation Partnership Project; Technical Specification Group Radio Access Network; NR; Radio Resource Control (RRC) protocol specification (Release 16)," Jul. 2020, 906 pages.

3GPP TS 36.331 V16.1.1, "3rd Generation Partnership Project; Technical Specification Group Radio Access Network; Evolved Universal Terrestrial Radio Access (E-UTRA); Radio Resource Control (RRC); Protocol specification (Release 16)," Jul. 2020, 1078 pages.

3GPP TS 38.133 V16.4.0, "3rd Generation Partnership Project; Technical Specification Group Radio Access Network; NR; Requirements for support of radio resource management (Release 16)," Jun. 2020, 1172 pages.

International Search Report and Written Opinion in International Appln. No. PCT/CN2020/119114, mailed on Jun. 24, 2021, 20 pages (with English translation).

Google Inc., "Discussion on SUL for NR-U SA," 3GPP TSG-RAN WG2 #105bis, R2-1903938(Revision of R2-1901158), Xi'an, China, Apr. 8-12, 2019, 2 pages.

OPPO, "Discussion on UE measurement capability and reporting criteria for NR-U," 3GPP TSG-RAN WG4 Meeting #92, R4-1909076, Ljubljana, Slovenija, Aug. 26-30, 2019, 3 pages.

Office Action in Japanese Appln. No. 2023-519560, mailed on Feb. 20, 2024, 9 pages (with English translation).

MTI, "UL carrier switch considering SUL in RRC_Connected," 3GPP TSG-RAN WG2 NR Ad hoc 1801, R2-1801463, Vancouver, Canada, Jan. 22-26, 2018, 5 pages.

3GPP TS 38.331 V16.0.0, "3rd Generation Partnership Project; Technical Specification Group Radio Access Network; NR; Radio Resource Control (RRC) protocol specification (Release 16)," Mar. 2020, 835 pages.

3GPP TS 38.321 V16.1.0, "3rd Generation Partnership Project; Technical Specification Group Radio Access Network; NR; Medium Access Control (MAC) protocol specification (Release 16)," Jul. 2020, 151 pages.

3GPP TS 36.305 V15.5.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)," Jul. 2020, 91 pages.

Extended European Search Report in European Appln No. 20955615.8, dated Jul. 24, 2023, 13 pages.

* cited by examiner (a)

(b)

(a)

(b)

METHOD FOR USING UNLICENSED SPECTRUM AND APPARATUS

CROSS-REFERENCE TO RELATED APPLICATIONS

This application is a continuation of International Application No. PCT/CN2020/119114, filed on Sep. 29, 2020, the disclosure of which is hereby incorporated by reference in its entirety.

TECHNICAL FIELD

This application relates to the field of communication technologies, and in particular, to a method for using an unlicensed spectrum and an apparatus.

BACKGROUND

Currently, a standard for a 5th generation (5G) communication system is being formulated. Compared with a (4th generation, 4G) system, the 5G system usually uses an electromagnetic wave in a higher frequency band for communication, and the electromagnetic wave in a higher frequency band usually means a higher loss. Therefore, the coverage capability of the 5G network is slightly weaker than that of the 4G network.

To compensate for weak coverage of the 5G network, a carrier aggregation (CA) technology may be used to aggregate a plurality of carriers to improve a 5G transmission capability. The carrier aggregation technology requires the carriers to be bound. It can be learned that, currently, there is a problem of poor flexibility when the coverage capability of 5G is improved through carrier aggregation.

SUMMARY

Embodiments of this application provide a method for using an unlicensed spectrum and an apparatus, to flexibly improve a coverage capability of a 5G network.

To achieve the foregoing objective, the following technical solutions are used in embodiments of this application.

According to a first aspect, a method for using an unlicensed spectrum is provided. The method may be performed by a network device or an apparatus supporting a network device function (for example, a chip system of the network device). The method includes: obtaining information about a target unlicensed frequency band, and transmitting, based on the information about the target unlicensed frequency band, a signal on a supplementary uplink SUL. A spectrum of the SUL includes the target unlicensed frequency band; and the information about the target unlicensed frequency band includes one of or a combination of more than one of the following information: reference signal received power RSRP, reference signal received quality RSRQ, and a signal to interference plus noise ratio SINR.

In this way, the target unlicensed frequency band is used for SUL communication of the network device, so that an uplink spectrum of the 5G network is extended, uplink coverage of the 5G network may be effectively improved, and carriers do not need to be bound, which is flexibly to implement.

In a possible design, the target unlicensed frequency band meets any one or more of the following first conditions: the RSRP is less than or equal to a first threshold, the RSRQ is less than or equal to a second threshold, and the SINR is less than or equal to a third threshold.

It may be learned that signal quality of an unlicensed frequency band that meets the first condition, that is, the target unlicensed frequency band, is generally weak. In this way, when the target unlicensed frequency band is used by different devices at the same time, interference between the two devices may be reduced. For example, when the target unlicensed frequency band is used by a base station and an access point (for example, a router) at the same time, a degree of mutual interference between the base station and the router is low.

In a possible design, the obtaining information about a target unlicensed frequency band includes:

receiving, from at least two terminal devices, at least two measurement reports, where each of the measurement reports includes a measurement result of each to-be-measured unlicensed frequency band in one or more to-be-measured unlicensed frequency bands, and the measurement result of each to-be-measured unlicensed frequency band includes any one or more of the following information about the to-be-measured unlicensed frequency band: RSRP, RSRQ, and an SINR; and obtaining, based on a plurality of measurement results in the at least two measurement reports, the information about the target unlicensed frequency band that meets the first condition in the one or more to-be-measured unlicensed frequency bands.

In this implementation, if most measurement results indicate that signal quality of one or more frequency bands is weak, the one or more frequency bands are used as the target unlicensed frequency band. Due to the reference of a plurality of measurement results, the obtained information about the target unlicensed frequency band is accurate.

In a possible design, a quantity of measurement results that meet the first condition is greater than or equal to a fourth threshold.

In a possible design, the obtaining information about a target unlicensed frequency band includes:

receiving, from a first terminal device, one or more measurement reports, where each of the measurement reports includes a measurement result of each to-be-measured unlicensed frequency band in one or more to-be-measured unlicensed frequency bands, and the measurement result of each to-be-measured unlicensed frequency band includes any one or more of the following information about the to-be-measured unlicensed frequency band: RSRP, RSRQ, and an SINR; and the obtaining information about a target unlicensed frequency band includes:

obtaining, based on the one or more measurement reports, the information about the target unlicensed frequency band that meets the first condition in the one or more to-be-measured unlicensed frequency bands, where the first terminal device is a terminal device in a configured coordination group, and the coordination group includes at least two terminal devices.

In this coordination manner, the quantity of measurement results that meet the first condition is not required, and the network device obtains the information about the target unlicensed frequency band through few measurement reports. Compared with a non-coordinated manner, signaling overheads caused by transmission of a measurement configuration and the measurement report may be reduced.

In a possible design, the method further includes:

receiving, from a second terminal device, a first measurement result; and determining, based on the first measurement result, position information of the second terminal device.

In a possible design, the determining, based on the first measurement result, position information of the second terminal device includes:

determining, if the first measurement result meets a second condition, that the second terminal device is located outdoors, where the second condition is any one of or a combination of more than one of the following conditions: the RSRP is less than or equal to a fifth threshold, the RSRQ is less than or equal to a sixth threshold, and the SINR is less than or equal to a seventh threshold; and determining, if the first measurement result meets a third condition, that the second terminal device is located indoors, where the third condition is any one of or a combination of more than one of the following conditions: the RSRP is greater than the fifth threshold, the RSRQ is greater than the sixth threshold, and the SINR is greater than the seventh threshold.

Through the positioning method, when a terminal device is located at a boundary between the indoor and the outdoor, or at a position such as a rooftop, coordinates of the terminal device may be positioned through a conventional positioning algorithm, but whether the terminal device is located indoors or outdoors cannot be determined. In this case, a network device may determine, based on a measurement report reported by the terminal device and information such as the coordinates of the terminal device, whether the terminal device is located indoors or outdoors, to improve precision of position identification.

According to a second aspect, this application provides a method for using an unlicensed spectrum. The method may be performed by a network device or an apparatus supporting a network device function (for example, a chip system of the network device). The method includes:

receiving, from a terminal device, a first measurement result, where the first measurement result includes any one or more of the following information about a to-be-measured unlicensed frequency band: reference signal received power RSRP, reference signal received quality RSRQ, and a signal to interference plus noise ratio SINR; and determining, based on the first measurement result, position information of the terminal device.

In a possible design, the determining, based on the first measurement result, position information of the terminal device includes:

determining, if the first measurement result meets a second condition, that the terminal device is located outdoors, where the second condition is any one of or a combination of more than one of the following conditions: the RSRP is less than or equal to a fifth threshold, the RSRQ is less than or equal to a sixth threshold, and the SINR is less than or equal to a seventh threshold; and determining, if the first measurement result meets a third condition, that the terminal device is located indoors, where the third condition is any one of or a combination of more than one of the following conditions: the RSRP is greater than the fifth threshold, the RSRQ is greater than the sixth threshold, and the SINR is greater than the seventh threshold.

According to a third aspect, this application provides a communication apparatus. The apparatus may be a network device or an apparatus supporting a network device function (for example, a chip system of the network device), and the apparatus includes:

a processor, configured to obtain information about a target unlicensed frequency band, where the information about the target unlicensed frequency band includes one of or a combination of more than one of the following information: reference signal received power RSRP, reference signal received quality RSRQ, and a signal to interference plus noise ratio SINR; and a transceiver, configured to transmit, based on the information about the target unlicensed frequency band, a signal on a supplementary uplink SUL, where a spectrum of the SUL includes the target unlicensed frequency band.

In a possible design, the target unlicensed frequency band meets any one or more of the following first conditions: the RSRP is less than or equal to a first threshold, the RSRQ is less than or equal to a second threshold, and the SINR is less than or equal to a third threshold.

In a possible design, that the processor is configured to obtain information about a target unlicensed frequency band includes: the processor is configured to:

control the transceiver to receive, from at least two terminal devices, at least two measurement reports, where each of the measurement reports includes a measurement result of each to-be-measured unlicensed frequency band in one or more to-be-measured unlicensed frequency bands, and the measurement result of each to-be-measured unlicensed frequency band includes any one or more of the following information about the to-be-measured unlicensed frequency band: RSRP, RSRQ, and an SINR; and obtain, based on a plurality of measurement results in the at least two measurement reports, the information about the target unlicensed frequency band that meets the first condition in the one or more to-be-measured unlicensed frequency bands.

In a possible design, a quantity of measurement results that meet the first condition is greater than or equal to a fourth threshold.

In a possible design, that the processor is configured to obtain information about a target unlicensed frequency band includes: the processor is configured to:

control the transceiver to receive, from a first terminal device, one or more measurement reports, where each of the measurement reports includes a measurement result of each to-be-measured unlicensed frequency band in one or more to-be-measured unlicensed frequency bands, and the measurement result of each to-be-measured unlicensed frequency band includes any one or more of the following information about the to-be-measured unlicensed frequency band: RSRP, RSRQ, and an SINR; and obtain, based on the one or more measurement reports, the information about the target unlicensed frequency band that meets the first condition in the one or more to-be-measured unlicensed frequency bands, where the first terminal device is a terminal device in a configured coordination group, and the coordination group includes at least two terminal devices.

In a possible design, the transceiver is further configured to receive, from a second terminal device, a first measurement result; and the processor is further configured to determine, based on the first measurement result, position information of the second terminal device.

In a possible design, that the processor is configured to determine, based on the first measurement result, position information of the second terminal device includes: the processor is configured to:

determine, if the first measurement result meets a second condition, that the second terminal device is located outdoors, where the second condition is any one of or a combination of more than one of the following conditions: the RSRP is less than or equal to a fifth threshold, the RSRQ is less than or equal to a sixth threshold, and the SINR is less than or equal to a seventh threshold; and determine, if the first measurement result meets a third condition, that the second terminal device is located indoors, where the third condition is any one of or a combination of more than one of the following conditions: the RSRP is greater than the fifth threshold, the RSRQ is greater than the sixth threshold, and the SINR is greater than the seventh threshold.

According to a fourth aspect, this application provides a communication apparatus. The apparatus may be a network device or an apparatus supporting a network device function (for example, a chip system of the network device), and the apparatus includes:

a transceiver, configured to receive, from a terminal device, a first measurement result, where the first measurement result includes any one or more of the following information about a to-be-measured unlicensed frequency band: reference signal received power RSRP, reference signal received quality RSRQ, and a signal to interference plus noise ratio SINR; and a processor, configured to determine, based on the first measurement result, position information of the terminal device.

In a possible design, that the processor is configured to determine, based on the first measurement result, position information of the terminal device includes: the processor is configured to:

determine, if the first measurement result meets a second condition, that the terminal device is located outdoors, where the second condition is any one of or a combination of more than one of the following conditions: the RSRP is less than or equal to a fifth threshold, the RSRQ is less than or equal to a sixth threshold, and the SINR is less than or equal to a seventh threshold; and determine, if the first measurement result meets a third condition, that the terminal device is located indoors, where the third condition is any one of or a combination of more than one of the following conditions: the RSRP is greater than the fifth threshold, the RSRQ is greater than the sixth threshold, and the SINR is greater than the seventh threshold.

According to a fifth aspect, this application provides a communication apparatus. The communication apparatus is configured to implement a function of the network device in any one of the foregoing aspects.

According to a sixth aspect, this application provides a communication apparatus. The apparatus has a function of implementing the method for using an unlicensed spectrum according to any one of the foregoing aspects. The function may be implemented by hardware, or may be implemented by hardware executing corresponding software. The hardware or the software includes one or more modules corresponding to the function.

According to a seventh aspect, a communication apparatus is provided. The communication apparatus includes a processor and a memory. The memory is configured to store computer-executable instructions. When the communication apparatus runs, the processor executes the computer-executable instructions stored in the memory, so that the communication apparatus performs the method for using an unlicensed spectrum according to any one of the foregoing aspects.

According to an eighth aspect, a communication apparatus is provided. The communication apparatus includes a processor. The processor is configured to: after being coupled to a memory and reading instructions in the memory, perform, based on the instructions, the method for using an unlicensed spectrum according to any one of the foregoing aspects.

According to a ninth aspect, embodiments of this application provide a communication apparatus. The communication apparatus includes: a processor and an interface circuit. The interface circuit is configured to receive code instructions and transmit the code instructions to the processor. The processor is configured to run the code instructions to perform the method for using an unlicensed spectrum according to any one of the foregoing aspects.

According to a tenth aspect, embodiments of this application provide a communication apparatus. The apparatus may be a chip system. The chip system includes a processor, and optionally, may further include a memory, configured to implement a function of the method described in any one of the foregoing aspects. The chip system may include a chip, or may include a chip and another discrete component.

According to an eleventh aspect, a communication apparatus is provided. The apparatus may be a circuit system, the circuit system includes a processing circuit, and the processing circuit is configured to perform the method for using an unlicensed spectrum according to any one of the foregoing aspects.

According to a twelfth aspect, embodiments of this application further provide a computer-readable storage medium. The computer-readable storage medium includes instructions, and when the instructions are run on a computer, the computer is enabled to perform the method in any one of the foregoing aspects.

According to a thirteenth aspect, embodiments of this application further provide a computer program product. The computer program product includes instructions. When the computer program product runs on a computer, the computer is enabled to perform the method in any one of the foregoing aspects.

DESCRIPTION OF EMBODIMENTS

In the specification and accompanying drawings of this application, the terms "first", "second", and the like are intended to distinguish between different objects or distinguish between different processing of a same object, but do not indicate a particular order of the objects.

"At least one" means one or more.

"Multiple" refers to two or more than two.

"And/or" describes an association relationship between associated objects, and represents that three relationships may exist. For example, A and/or B may represent the following cases: Only A exists, both A and B exist, and only B exists, where A and B may be singular or plural.

The character "/" generally indicates an "or" relationship between associated objects. For example, A/B may represent A or B.

In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the specification and the accompanying drawings of this application, "of (English: of)", "relevant (English: corresponding, relevant)", and "corresponding (English: corresponding)" may sometimes be interchangeably used. It should be noted that consistent meanings are expressed when differences are not emphasized.

Figures 1, 2:
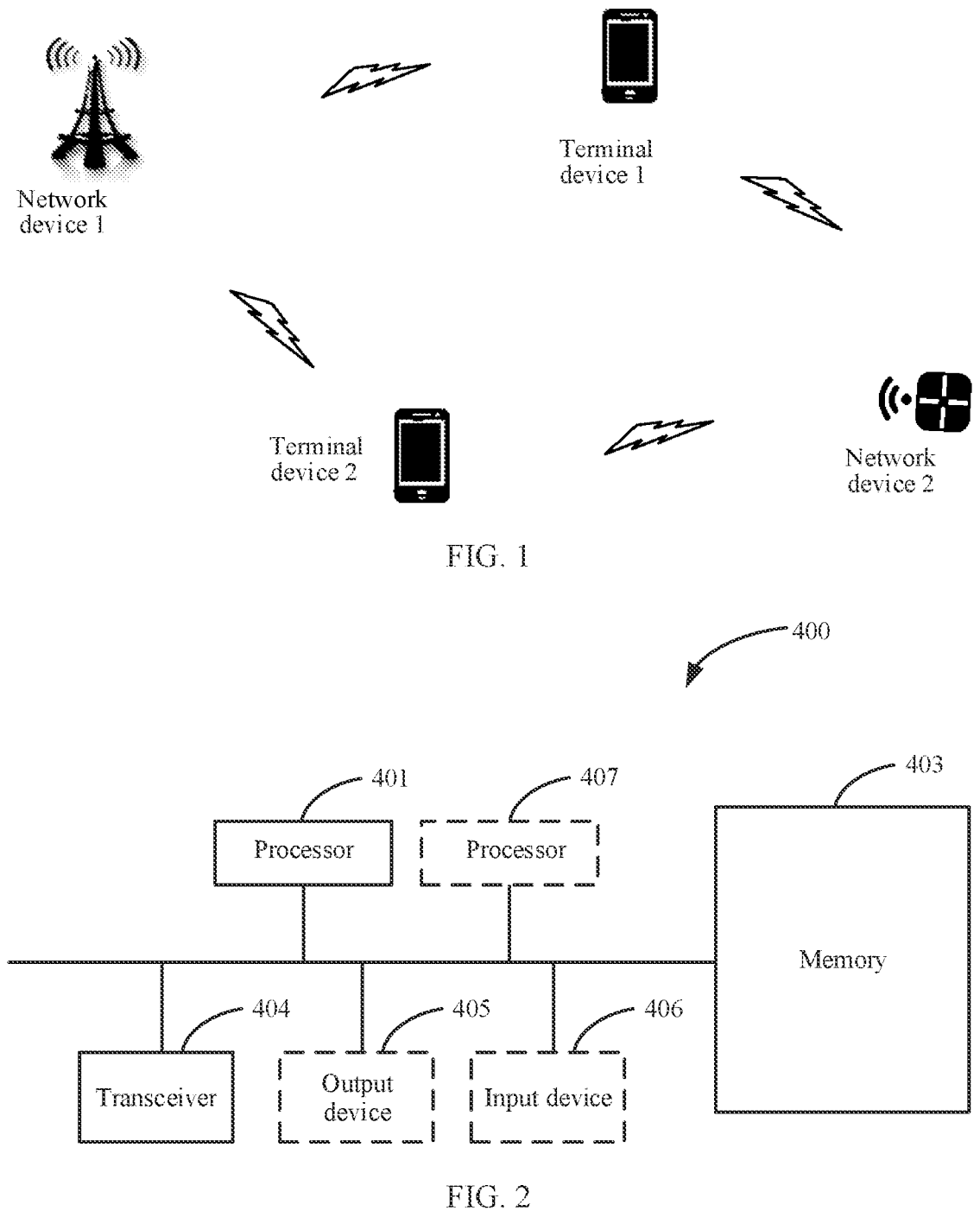
FIG. 1 is a schematic diagram of an architecture of a communication system according to an embodiment of this application.
FIG. 2 is a schematic diagram of a structure of a communication apparatus according to an embodiment of this application.

Embodiments of this application provide a method for using an unlicensed spectrum. The method for using an unlicensed spectrum is applied to a communication system with weak uplink coverage, to improve an uplink coverage capability of the communication system. For example, the method is applied to a 5G system, a subsequent evolved system, or another system. FIG. 1 is an example architecture of a communication system to which an embodiment of this application is applicable. As shown in FIG. 1, the communication system includes a network device (for example, a network device 1 and a network device 2 shown in FIG. 1) and a terminal device (for example, a terminal device 1 and a terminal device 2 shown in FIG. 1).

The foregoing network devices may communicate with each other. The terminal devices may communicate with each other. The network device and the terminal device may also communicate with each other.

The network device 2 is a device that is located on a network side of the communication system and has a wireless transceiver function, or a chip or a chip system that may be arranged in the device, or another component that has a network device function. Specifically, the network device 2 is a device using an unlicensed frequency band. The network device 2 includes, but is not limited to: an access point (AP) in a wireless fidelity (Wi-Fi) system, for example, a home gateway, a router, a server, a switch, a bridge, or the like.

The network device 1 is a device that is located on a network side of the communication system and has a wireless transceiver function, or a chip or a chip system that may be arranged in the device, or another component that has a network device function. The network device 1 includes, but is not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a radio relay node, a radio backhaul node, a transmission and reception point (TRP, or a transmission point, TP), or the like. The network device 1 may further be a gNB or a transmission and reception point (TRP or TP) in a 5G system, for example, a new radio (NR) system, one or a group of antenna panels (including a plurality of antenna panels) of a base station in a 5G system, or a network node that forms a gNB or a transmission and reception point, for example, a baseband unit (BBU), a distributed unit (DU), a road side unit (RSU) having a base station function, or the like.

The terminal device is a terminal that accesses the communication system and has a wireless transceiver function, a chip or a chip system that may be arranged in the terminal, or another component that has a terminal function. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, a vehicle-mounted terminal, an RSU that has a terminal function, or the like. The terminal device in this application may further be a vehicle-mounted module, a vehicle-mounted assembly, a vehicle-mounted component, a vehicle-mounted chip, or a vehicle-mounted unit that is built in a vehicle as one or more components or units. By using the built-in vehicle-mounted module, the vehicle-mounted assembly, the vehicle-mounted component, the vehicle-mounted chip, or the vehicle-mounted unit, the method for using an unlicensed spectrum provided in this application may be implemented.

Optionally, in the system architecture, there may be another quantity of network devices, and there may be another quantity of terminal devices. Optionally, the system architecture may further include another device. This is not limited in embodiments of this application.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Optionally, the terminal device and the network device in embodiments of this application may be implemented through a communication device having a structure described in FIG. 2. FIG. 2 is a schematic diagram of a structure of hardware of a communication device according to an embodiment of this application. A communication device 400 includes at least one processor 401, a memory 403, and at least one transceiver 404. The memory 403 may alternatively be included in the processor 401.

The processor 401 may include one or more processing units. The processing unit may be a central processing unit (CPU), an application-specific integrated circuit (ASIC), or one or more integrated circuits configured to control program execution of the solutions of this application.

There may be a communication line between the foregoing components, and the communication line is configured to transmit information between the components.

The transceiver 404 is configured to communicate with another device. In embodiments of this application, the transceiver may be a module, a circuit, an interface, or another apparatus that implements a communication function, and is configured to communicate with another device. Optionally, the transceiver may be a transmitter that is independently disposed, and the transmitter may be configured to send information to the another device; or the transceiver may be a receiver that is independently disposed, and is configured to receive information from the another device. Alternatively, the transceiver may be a component integrating functions of sending and receiving information. A specific implementation of the transceiver is not limited in embodiments of this application.

The memory 403 may be a read-only memory (ROM) or another type of storage module that can store static information and instructions, a random access memory (RAM) or another type of storage module that can dynamically store information and instructions, or may be an electrically erasable programmable read-only memory (EEPROM), an optical disc, a magnetic disk, or another magnetic storage device. The memory may exist independently, and is connected to the processor through a communication line. The memory may alternatively be integrated with the processor.

The memory 403 is configured to store computer-executable instructions. The computer-executable instructions may be invoked by one or more processing units in the processor 401 to perform corresponding steps in the methods provided in the following embodiments.

Optionally, the computer-executable instructions in embodiments of this application may also be referred to as application program code, instructions, a computer program, or another name. This is not specifically limited in embodiments of this application.

During specific implementation, in an embodiment, the communication device 400 may include a plurality of processors, for example, the processor 401 and a processor 407 in FIG. 2. Each of the processors may be a single-core processor, or may be a multi-core processor. The processor herein may be one or more devices, circuits, and/or processing cores configured to process data (for example, computer program instructions).

In a specific implementation, in an embodiment, the communication device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

FIG. 2 is an example diagram of a structure of the communication device. It should be understood that the communication device shown in the figure is merely an example, and during actual application, the communication device may have more or fewer components than those shown in FIG. 2, or two or more components may be combined, or the communication device may have different component configurations.

The communication device 400 may be a general-purpose device or a dedicated device. A type of the communication device 400 is not limited in embodiments of this application. The terminal device or the network device may be a device having a structure similar to that in FIG. 2.

With reference to the accompanying drawings, the following describes in detail a method for using an unlicensed spectrum provided in embodiments of this application.

Figure 3:
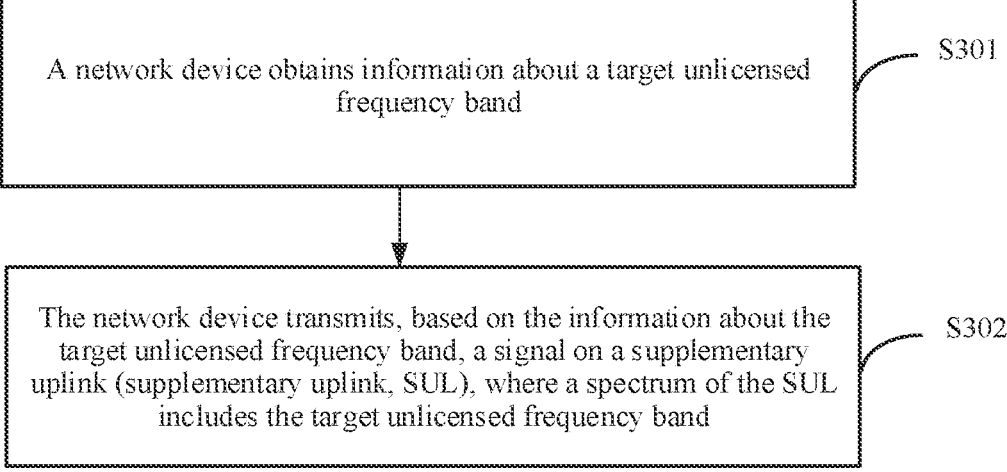
FIG. 3 is a schematic flowchart of a method for using an unlicensed spectrum according to an embodiment of this application.

Refer to FIG. 3. A slice access method provided in embodiments of this application includes the following steps.

S301: A network device obtains information about a target unlicensed frequency band.

The network device may be the network device 1 shown in FIG. 1. For example, the network device may be a base station.

The information about the target unlicensed frequency band includes one of or a combination of more than one of the following information: RSRP, RSRQ, and an SINR.

One or more target unlicensed frequency bands meet a first condition. The first condition may be a condition for indicating signal quality or a connection state (for example, a Wi-Fi connection state). In a possible design, the first condition includes: (1) reference signal received power (RSRP) is less than or equal to a first threshold, and/or (2) reference signal received quality (RSRQ) is less than or equal to a second threshold, and/or (3) a signal to interference plus noise ratio (SINR) is less than or equal to a third threshold.

That is, the one or more target unlicensed frequency bands are required to meet at least one of the three conditions (1) to (3).

Optionally, the first condition may alternatively be another condition for limiting signal quality, for example, a condition for indicating a channel quality indication (CQI). Specifically, the first condition may further include that the CQI is less than or equal to a preset threshold. A specific design of the first condition is not limited in embodiments of this application.

It may be learned that signal quality of an unlicensed frequency band that meets the first condition, that is, the target unlicensed frequency band, is generally weak. In this way, when the target unlicensed frequency band is used by different devices at the same time, interference between the two devices may be reduced.

The following describes a method through which a network device obtains one or more target unlicensed frequency bands. Refer to (a) in FIG. 4 or (a) in FIG. 5. The method includes the following steps.

S3011: A network device sends a measurement configuration to one or more terminal devices.

Correspondingly, the one or more terminal devices receive the measurement configuration from the network device.

The measurement configuration includes a measurement object configuration and a measurement reporting configuration. The measurement object configuration includes measurement frequency information. A to-be-measured frequency refers to an unlicensed frequency band. The unlicensed frequency band may be an unlicensed frequency band used in various communication technologies. For example, when a Wi-Fi operating frequency band is measured, a to-be-measured unlicensed frequency band is a frequency band in ranges of 2.4 GHz and 5 GHz. For example, a frequency band in the 5 GHz range may be from 5.15 GHz to 5.85 GHz. The measurement frequency information may be an absolute radio frequency channel number (ARFCN) of the to-be-measured frequency, a frequency index, or the like.

The measurement reporting configuration includes a reporting value and a reporting method. The reporting value includes, but is not limited to, RSRP, and/or RSRQ, and/or an SINR, and/or a CQI. That is, the reporting value is one or more of the RSRP, the RSRQ, the SINR, and the CQI. Units of the RSRP, the RSRQ, and the SINR are dB.

The reporting method may be periodic reporting or event reporting. The event reporting means that the terminal device reports a measurement result only when a specific condition is met. When the network device configures, through the measurement configuration, the terminal device to periodically report the measurement result, the network device is further required to indicate information such as a reporting period in the measurement configuration. When the network device configures, through the measurement configuration, the terminal device to report the measurement result as an event, the network device is further required to indicate, in the measurement configuration, an event that triggers reporting of the measurement result. The event that triggers reporting of the measurement result may be, for example, EventA1, EventA2, EventA3, EventB2, or the like. Details of an event that triggers a reporting action may be referred to a 38.331 standard of a 3rd generation partnership project (3rd generation partnership project, 3GPP) and another conventional technology. Details are not described herein again.

For example, specific content included in the measurement configuration may be referred to the following Table 1.

TABLE 1

| Measurement configuration | Related sub-item | Description |
|---|---|---|
| Measurement object configuration | Measurement frequency information | ARFCN or frequency index |
| Measurement reporting configuration | Periodic reporting | Reporting period |
| | Event reporting | Trigger event |
| | Reporting value | RSRP, and/or RSRQ, and/or SINR, and/or CQI |

Optionally, the network device configures, through the measurement configuration, the terminal device to report a measurement result that meets one or more of the following conditions: a measurement result whose RSRP ranges from −156 dBm to −31 dBm, a measurement result whose RSRQ ranges from −43 dB to 20 dB, and a measurement result whose SINR ranges from −23 dB to 40 dB. Certainly, a specific value range may be alternatively set separately. This is not limited in embodiments of this application. For the CQI, the network device may further configure the terminal device to report a measurement result whose CQI is in a specific range. Reporting conditions of the RSRP, the RSRQ, the SINR, and the CQI that are configured by the network device may be referred to the following Table 2.

TABLE 2

| Measurement configuration | Related sub-item | Description |
|---|---|---|
| Measurement object configuration | Measurement frequency information | ARFCN or frequency index |
| Measurement result | RSRP | a measurement result whose RSRP ranges from −156 dBm to −31 dBm |
| | RSRQ | a measurement result whose RSRQ ranges from −43 dB to 20 dB |
| | SINR | a measurement result whose SINR ranges from −23 dB to 40 dB |

S3012: The one or more terminal devices measure, based on the measurement configuration, a to-be-measured frequency.

A center frequency of a to-be-measured unlicensed frequency band may be referred to as a to-be-measured frequency. Measuring the to-be-measured frequency may also be understood as measuring the to-be-measured unlicensed frequency band.

For example, the terminal device measures RSRP, and/or RSRQ, and/or SINRs, and/or CQIs, and the like of a plurality of Wi-Fi unlicensed frequencies.

S3013: The one or more terminal devices send one or more measurement reports to the network device.

Correspondingly, the network device receives the one or more measurement reports from the one or more terminal devices.

The measurement report includes a measurement result of a preset indicator of the to-be-measured unlicensed frequency band. The preset indicator includes RSRP, RSRQ, and/or an SINR, that is, the preset indicator includes one or more of RSRP, RSRQ, an SINR, and a CQI.

Optionally, the terminal device may reuse an NR message interface MeasurementReport to report the measurement report to the network device, or the terminal device reports, through an independent message interface, one or more measurement results corresponding to one or more unlicensed frequency bands to the network device.

S3014: The network device obtains, based on the one or more measurement reports, information about a target unlicensed frequency band.

The information about the unlicensed frequency band includes but is not limited to RSRP, RSRQ, an SINR, and/or a CQI, that is, includes one or more of the RSRP, the RSRQ, the SINR, and the CQI.

Figure 4:
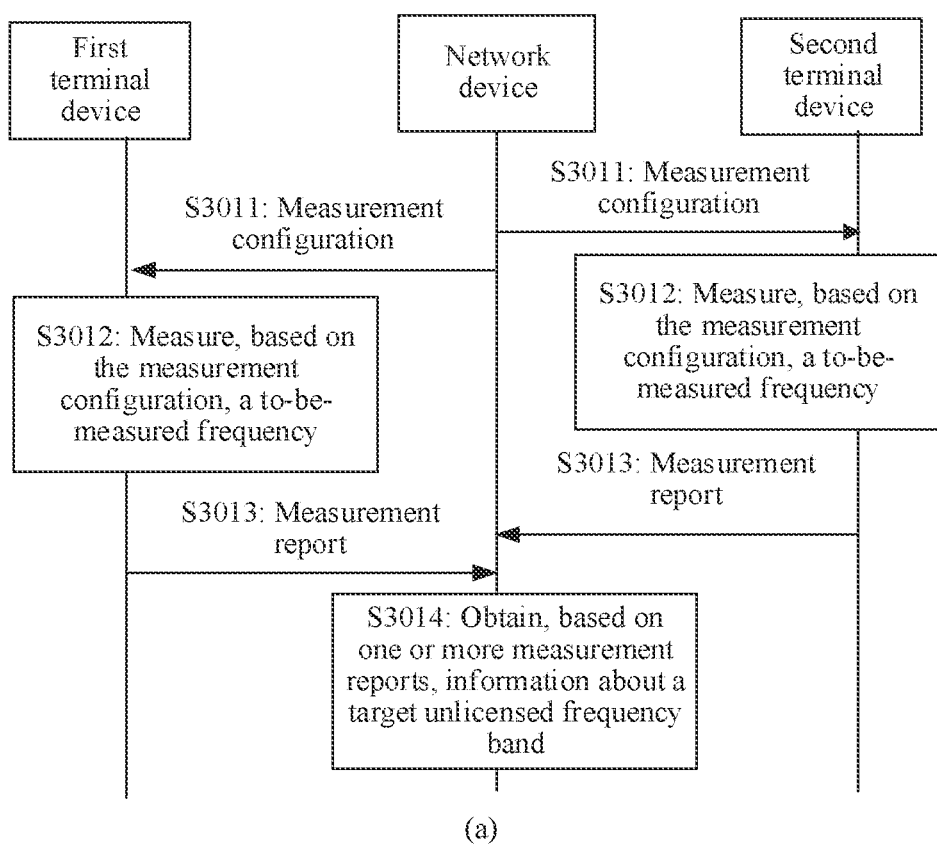
FIG. 4 is a first schematic diagram of a scenario of a method for using an unlicensed spectrum according to an embodiment of this application.
Figure 4:
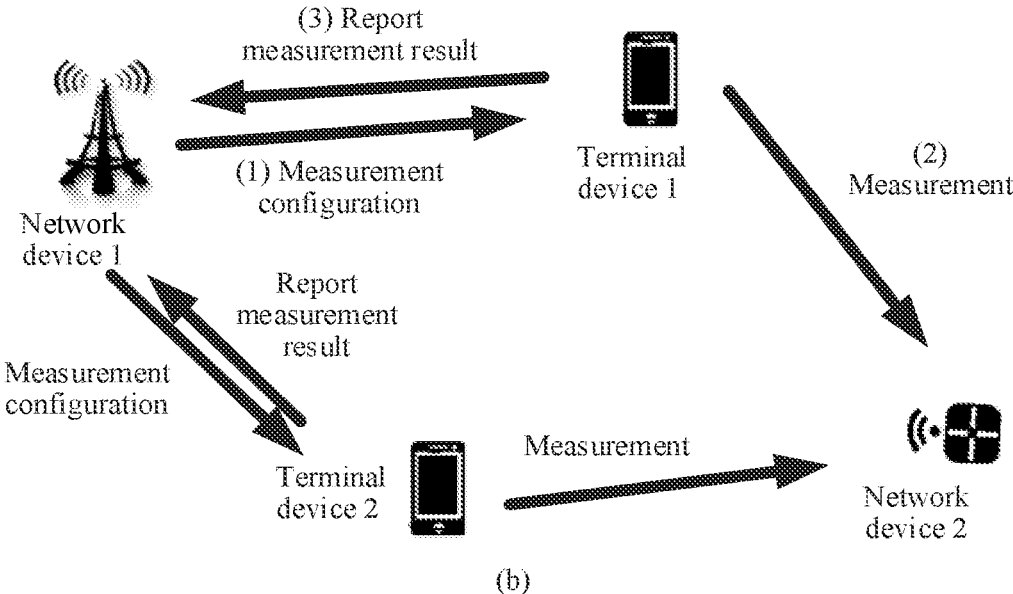
Figure 5:
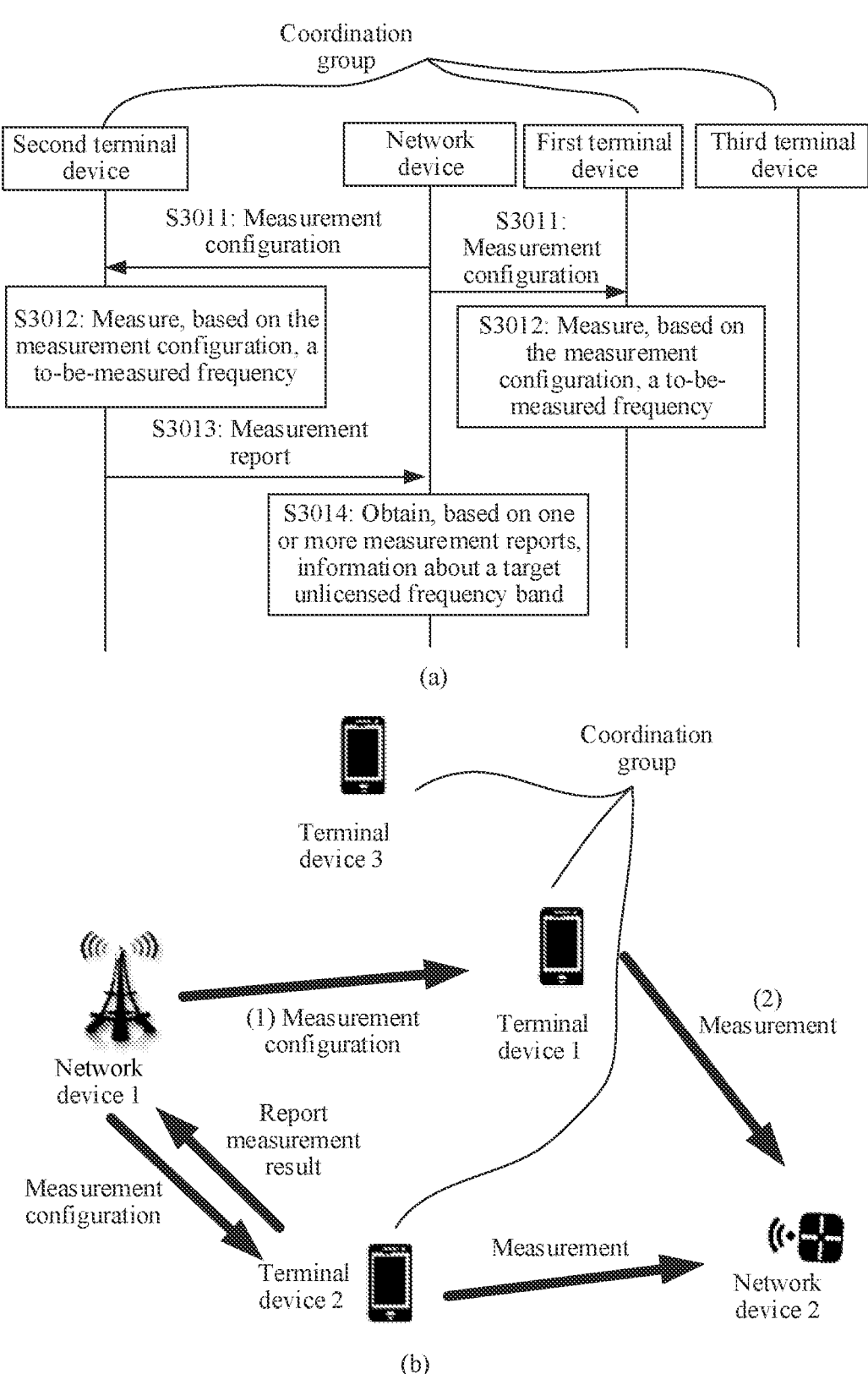
FIG. 5 is a second schematic diagram of a scenario of a method for using an unlicensed spectrum according to an embodiment of this application.

In a possible implementation, refer to (a) in FIG. 4. A network device may deliver a measurement configuration to a plurality of terminal devices. A to-be-measured unlicensed frequency is measured through a plurality of terminal devices.

Optionally, the network device may deliver a same measurement configuration to the plurality of terminal devices. For example, the plurality of terminal devices are configured to measure RSRP, RSRQ, an SINR, and a CQI of an unlicensed frequency band of Wi-Fi, and an unlicensed frequency band that meets a first condition is used as a target unlicensed frequency band.

Alternatively, optionally, the network device may deliver a same measurement configuration to some terminal devices, and deliver different measurement configurations to the other terminal devices. For example, the network device configures a terminal device 1 to a terminal device 3 to measure the RSRP and the RSRQ of the unlicensed frequency band of Wi-Fi, and configures a terminal device 4 to a terminal device 6 to measure the SINR and the CQI of the unlicensed frequency band of Wi-Fi. In another example, the network device configures the terminal device 1 to the terminal device 3 to measure the RSRP, the RSRQ, the SINR, and the CQI of a 5 GHz unlicensed frequency band of Wi-Fi, and configures the terminal device 4 to the terminal device 6 to measure the RSRP, the RSRQ, the SINR, and the CQI of a 2.4 GHz unlicensed frequency band of Wi-Fi.

In this implementation, the network device receives at least two measurement reports from at least two terminal devices, and obtains, based on a plurality of measurement results in the at least two measurement reports, information about one or more unlicensed frequency bands. For example, refer to (a) in FIG. 4. The network device obtains, based on a measurement report (it is assumed that the measurement report includes measurement results of RSRP, RSRQ, SINRs, and CQIs of 5 GHz and 2.4 GHz unlicensed frequency bands) of a first terminal device and a measurement report (it is assumed that the measurement report includes measurement results of RSRP, RSRQ, SINRs, and CQIs of 5 GHz and 2.4 GHz unlicensed frequency bands) of a second terminal device, information about one or more unlicensed frequency bands. A schematic diagram of a scenario of the method may be referred to (b) in FIG. 4.

Optionally, in this implementation, considering that measurement results at a plurality of time points of a base station may be inconsistent, or measurement results of a plurality of terminals of a base station may be inconsistent, it needs to be ensured that, within a preset time period, a quantity of measurement results that meet a first condition needs to be greater than or equal to a fourth threshold. Alternatively, a ratio of the quantity of measurement results that meet the first condition to a quantity of measurement results that do not meet the first condition needs to be greater than or equal to an eighth threshold. Alternatively, the ratio of the quantity of measurement results that meet the first condition to a total quantity of measurement results needs to be greater than or equal to a ninth threshold. The fourth threshold, the eighth threshold, and the ninth threshold may be flexibly set. This is not limited in embodiments of this application.

For example, the quantity of measurement results that meet the first condition is greater than or equal to the fourth threshold, the preset time period is one minute, it is specified that the measurement results are collected six times within one minute, and the fourth threshold is 5. For a terminal 1, measurement results of a 5.15 GHz frequency measured at a time point 1, a time point 3, and a time point 6 all meet the first condition, and a measurement result of the 5.15 GHz frequency measured at a time point 2 does not meet the first condition. Because the quantity of measurement results (5) that meet the first condition is equal to the fourth threshold, it may be considered that measurement results at most time points indicate that signal quality of the 5.15 GHz frequency is poor, and the 5.15 GHz frequency may be used as a target unlicensed frequency band.

In another example, in the preset time period, six terminal devices report measurement results, and the fourth threshold is 4. For the terminal 1, and a terminal 3 to a terminal 6, measurement results of a 5.15 GHz frequency all meet the first condition. A measurement result of a terminal 2 on the 5.15 GHz frequency does not meet the first condition. Because a quantity of measurement results (five measurement results of the terminal and the terminal 3 to the terminal 6) that meet the first condition is greater than the fourth threshold (4), it may be considered that measurement results of most terminal devices indicate that signal quality of the 5.15 GHz frequency is poor, and the 5.15 GHz frequency may be used as a target unlicensed frequency band.

In this implementation, if most measurement results indicate that signal quality of one or more frequency bands is weak, the one or more frequency bands are used as the target unlicensed frequency band. Due to the reference of a plurality of measurement results, the obtained information about the target unlicensed frequency band is accurate.

In another possible implementation, a network device may configure a coordination group. For example, the coordination group may be, but is not limited to, a device to device (D2D) coordination group. The coordination group includes at least two terminal devices. The network device sends a measurement configuration to some terminal devices in the coordination group, and measures, through the some terminal devices, a to-be-measured unlicensed frequency band. For example, refer to (a) in FIG. 5. The network device configures a coordination group, and the coordination group includes a first terminal device, a second terminal device, and a third terminal device. The network device sends a measurement configuration to the first terminal device and the second terminal device, and measures, through the first terminal device and the second terminal device, the to-be-measured unlicensed frequency band. A schematic diagram of a scenario of the method may be referred to (b) in FIG. 5.

Different from the foregoing non-coordinated manner in which a quantity of measurement results that meet the first condition is required, in a coordinated manner, a quantity of measurement results that meet the first condition is not limited, and the network device may obtain, based on one or more measurement results reported by some terminal devices, information about a target unlicensed frequency band.

It should be noted that, the network device delivers the measurement configuration to the first terminal device and the second terminal device. If the measurement configuration indicates that a measurement result is reported as an event, at a time point, the second terminal device may trigger reporting of a measurement result as an event, but the first terminal device has not triggered the event and does not report the measurement result. In this case, the network device may first receive one or more measurement reports from the second terminal device, and obtain, based on the one or more measurement reports, information about one or more unlicensed frequency bands. The network device does not need to wait for a measurement report of the first terminal device.

In this coordination manner, the quantity of measurement results that meet the first condition is not required, and the network device obtains the information about the target unlicensed frequency band through few measurement reports. Compared with a non-coordinated manner, signaling overheads caused by transmission of a measurement configuration and the measurement report may be reduced.

S302: The network device transmits, based on the information about the target unlicensed frequency band, a signal on a supplementary uplink (SUL), where a spectrum of the SUL includes the target unlicensed frequency band.

In other words, the target unlicensed frequency band is used as an SUL frequency domain resource of the network device. That is, in embodiments of this application, the spectrum of the SUL includes the target unlicensed frequency band. For example, refer to FIG. 6. A base station configures an uplink (UL) carrier used for uplink transmission and a downlink (DL) carrier used for downlink transmission for a cell. In this way, in a specific coverage range, for example, in a shadow region shown in FIG. 6, a terminal 1 may send uplink information to the base station through the UL carrier, and receive downlink information from the base station through the DL carrier.

To further improve an uplink coverage capability of the cell, the base station may further configure an SUL carrier for the cell. Specifically, a router works in an unlicensed frequency band, and the base station instructs a terminal to detect one or more unlicensed frequency bands, to obtain a target unlicensed frequency band that causes little interference to the base station, for example, 2.4 GHz. The base station configures a 2.4 GHz carrier as the SUL carrier of the cell. In this way, in a specific coverage range, for example, in a large elliptic region shown in FIG. 6, a terminal 2 may send uplink information to the base station through the SUL carrier. It can be learned that, compared with a case that downlink transmission can be performed in the shadow region shown in FIG. 6, the terminal can perform uplink transmission not only in the shadow region, but also in a region outside the shadow region, which improves an uplink coverage capability of a network.

According to the method for using an unlicensed spectrum provided in embodiments of this application, the target unlicensed frequency band is used for SUL communication of the network device, so that an uplink spectrum of the 5G network is extended, uplink coverage of the 5G network may be effectively improved, and carriers do not need to be bound, which is flexibly to implement.

In addition, signal quality of the target unlicensed frequency band is weak. In this way, even if a 5G network device and another device (for example, a Wi-Fi router) work in a same target unlicensed frequency band, because signal quality of the another device is weak, interference caused by the another device to the 5G network device is little, and normal use of the 5G network device is usually not affected.

Figures 6, 7:
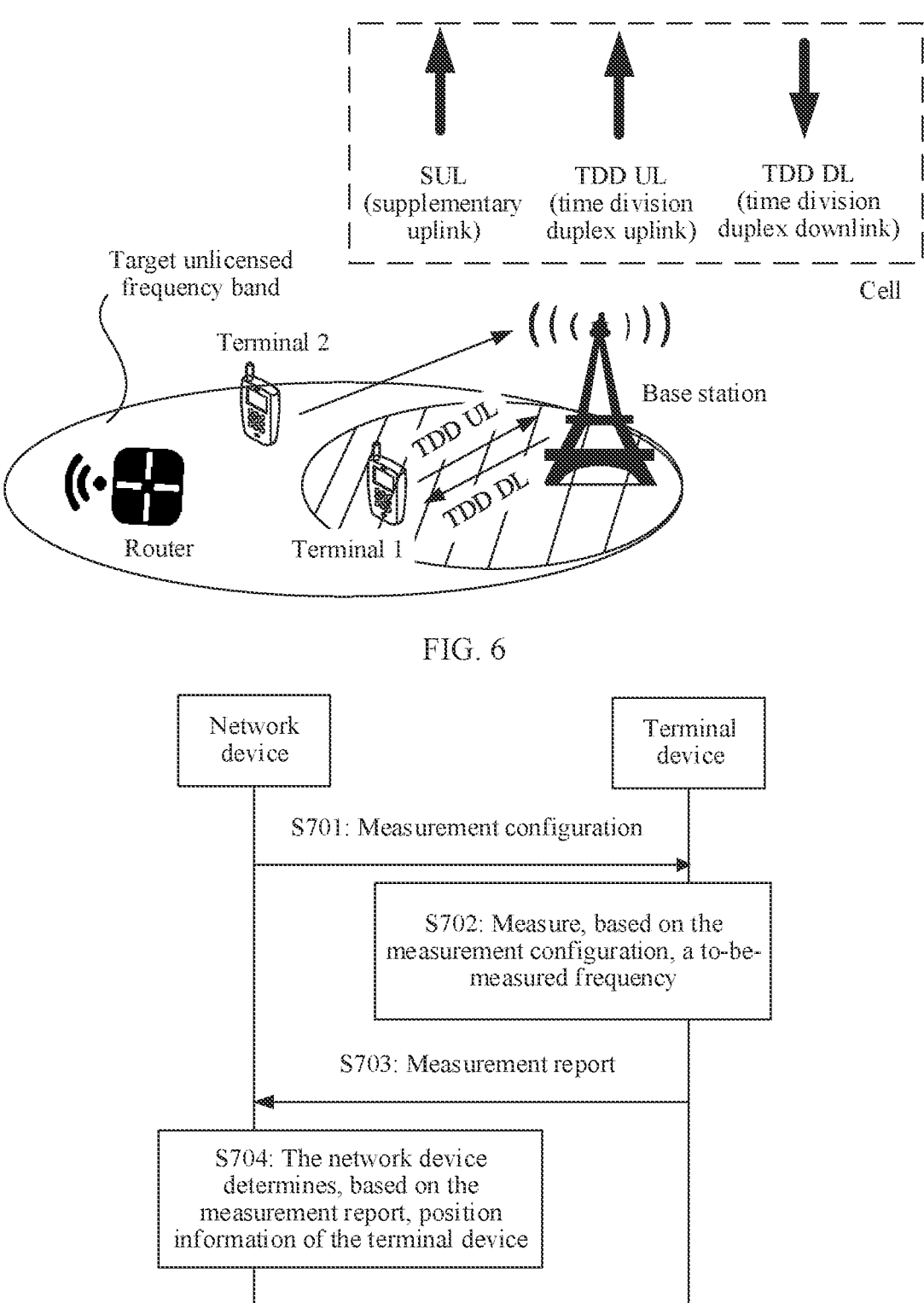
FIG. 6 is a schematic diagram of a scenario of a supplementary uplink according to an embodiment of this application.
FIG. 7 is a schematic flowchart of a method for using an unlicensed spectrum according to an embodiment of this application.

Embodiments of this application further provide a method for using an unlicensed spectrum. Refer to FIG. 7. The method includes the following steps.

S701: A network device sends a measurement configuration to a terminal device.

Correspondingly, the terminal device receives the measurement configuration from the network device.

S702: The terminal device measures, based on the measurement configuration, a to-be-measured frequency.

S703: The terminal device sends a measurement report to the network device.

Correspondingly, the network device receives the measurement report from the terminal device.

The measurement report includes one or more measurement results.

S704: The network device determines, based on the measurement report, position information of the terminal device.

In a possible implementation, if RSRP is less than or equal to a fifth threshold, and/or RSRQ is less than or equal to a sixth threshold, and/or an SINR is less than or equal to a seventh threshold, the SINR network device determines that the terminal device is located outdoors. Alternatively, if RSRP is greater than a fifth threshold, and/or RSRQ is greater than a sixth threshold, and/or is greater than a seventh threshold, the network device determines that the terminal device is located indoors.

In other words, if the measurement result meets a second condition, it is determined that the second terminal device is located outdoors, where the second condition is any one of or a combination of more than one of the following conditions: the RSRP is less than or equal to a fifth threshold, the RSRQ is less than or equal to a sixth threshold, and the SINR is less than or equal to a seventh threshold; and if the measurement result meets a third condition, it is determined that the second terminal device is located indoors, where the third condition is any one of or a combination of more than one of the following conditions: the RSRP is greater than the fifth threshold, the RSRQ is greater than the sixth threshold, and the SINR is greater than the seventh threshold.

Optionally, the measurement result is a time sequence, and the network device may perform a series of processing on the time sequence, for example, perform conversion from time domain to frequency domain. The network device determines, based on a processed measurement result, the position information of the terminal device. Optionally, the network device may further assist in obtaining a position of the terminal device with reference to other radio information, to improve precision of position identification. The other wireless information may be, for example, but is not limited to, global positioning system (GPS) information. For example, when the terminal device is located at a boundary between the indoor and the outdoor, or at a position such as a rooftop, coordinates of the terminal device may be positioned through a conventional positioning algorithm, but whether the terminal device is located indoors or outdoors cannot be determined. In this case, the network device may determine, based on a measurement report reported by the terminal device and information such as the coordinates of the terminal device, whether the terminal device is located indoors or outdoors, to improve precision of position identification.

It should be understood that the solutions in embodiments of this application may be properly combined for use, and explanations or descriptions of terms in embodiments may be cross-referenced or explained in embodiments. This is not limited.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be understood that, to implement functions of any one of the foregoing embodiments, the network device or another device (such as a terminal) includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device or another device (such as a terminal) may be divided. For example, each functional module may be divided based on each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 8:
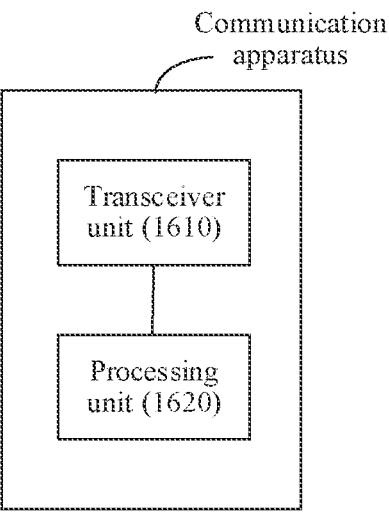
FIG. 8 is a schematic diagram of a structure of a communication apparatus according to an embodiment of this application.

For example, when each functional module is divided in an integrated manner, FIG. 8 is a block diagram of a structure of a communication apparatus according to an embodiment of this application. The communication apparatus may be a network device or an apparatus that supports a network device function (for example, but not limited to, a chip system). The communication apparatus may include a transceiver unit 1610 and a processing unit 1620.

The transceiver unit 1610 is configured to support the network device in performing the foregoing steps S3011, S3013, S701, and S703, and/or another process of the technology described in this specification. The processing unit 1620 is configured to assist the network device in performing the foregoing steps S302, S301, S3012, S3014, and S704, and/or another process of the technology described in this specification.

Optionally, the communication apparatus further includes a storage unit (not shown in FIG. 8). The storage unit is configured to store program code and data of the communication apparatus, where the data may include but is not limited to original data, intermediate data, or the like.

In a possible manner, the processing unit 1620 may be a controller or the processor 401 or the processor 407 shown in FIG. 2. For example, the processing unit 1620 may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The transceiver unit 1610 may be the transceiver 404 shown in FIG. 2, or may be a transceiver circuit or the like. The storage unit may be the memory 403 shown in FIG. 2.

A person of ordinary skill in the art may understand that all or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located at one position, or may be distributed on a plurality of network devices (for example, terminal devices). Some or all of the units may be selected based on actual requirements to achieve the objectives of the solutions of embodiments.

In addition, function units in embodiments of this application may be integrated into one processing unit, or each of the function units may exist alone physically, or two or more units are integrated into one unit. The integrated unit may be implemented as hardware, or may be implemented as a combination of hardware and a software functional unit.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions in this application essentially or the part contributing to the conventional technology may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:

receiving, from at least two terminal devices, at least two measurement reports, wherein each of the at least two measurement reports comprises a measurement result of each to-be-measured unlicensed frequency band in one or more to-be-measured unlicensed frequency bands;

obtaining, based on measurement results comprised in the at least two measurement reports, information about a target unlicensed frequency band that meets at least one of first conditions in the one or more to-be-measured unlicensed frequency bands, wherein the information about the target unlicensed frequency band comprises at least one of reference signal received power (RSRP) of the target unlicensed frequency band, reference signal received quality (RSRQ) of the target unlicensed frequency band, or a signal to interference plus noise ratio (SINR) of the target unlicensed frequency band; and transmitting, based on the information about the target unlicensed frequency band, a signal on a supplementary uplink (SUL), wherein a spectrum of the SUL comprises the target unlicensed frequency band.

2. The method according to claim 1, wherein the target unlicensed frequency band meets the at least one of first conditions comprising: the RSRP of the target unlicensed frequency band is less than or equal to a first threshold, the RSRQ of the target unlicensed frequency band is less than or equal to a second threshold, or the SINR of the target unlicensed frequency band is less than or equal to a third threshold.

3. The method according to claim 2, wherein the measurement result of the each to-be-measured unlicensed frequency band comprises one or more of RSRP of the each to-be-measured unlicensed frequency band, RSRQ of the each to-be-measured unlicensed frequency band, and an SINR of the each to-be-measured unlicensed frequency band.

4. The method according to claim 3, wherein a quantity of measurement results that meet the at least one of the first conditions is greater than or equal to a fourth threshold.

5. The method according to claim 2, wherein the obtaining information about a target unlicensed frequency band comprises:

receiving, from a first terminal device, one or more measurement reports, wherein each of the one or more measurement reports comprises a measurement result of each to-be-measured unlicensed frequency band in one or more to-be-measured unlicensed frequency bands, and the measurement result of the each to-be-measured unlicensed frequency band comprises one or more of RSRP of the each to-be-measured unlicensed frequency band, RSRQ of the each to-be-measured unlicensed frequency band, and an SINR of the each to-be-measured unlicensed frequency band; and obtaining, based on the one or more measurement reports, the information about the target unlicensed frequency band that meets the at least one of the first conditions in the one or more to-be-measured unlicensed frequency bands, wherein the first terminal device belongs to a configured coordination group comprising at least two terminal devices.

6. The method according to claim 5, further comprising:

receiving, from a second terminal device, a first measurement result; and determining, based on the first measurement result, position information of the second terminal device.

7. The method according to claim 6, wherein the determining, based on the first measurement result, position information of the second terminal device comprises:

determining that the second terminal device is located outdoors in response to determining that the first measurement result meets a second condition, wherein the second condition comprises at least one of: RSRP in the first measurement result is less than or equal to a fifth threshold, RSRQ in the first measurement result is less than or equal to a sixth threshold, and an SINR in the first measurement result is less than or equal to a seventh threshold; and determining that the second terminal device is located indoors in response to determining that the first measurement result meets a third condition, wherein the third condition comprises at least one of: the RSRP in the first measurement result is greater than the fifth threshold, the RSRQ in the first measurement result is greater than the sixth threshold, and the SINR in the first measurement result is greater than the seventh threshold.

8. A method comprising:

receiving, from a terminal device, a first measurement result of each to-be-measured unlicensed frequency band in one or more to-be-measured unlicensed frequency bands, wherein the first measurement result comprises information about a to-be-measured unlicensed frequency band that meets at least one of first conditions in the one or more to-be-measured unlicensed frequency bands, wherein the information about the to-be-measured unlicensed frequency band comprises at least one of: reference signal received power (RSRP), reference signal received quality (RSRQ), or a signal to interference plus noise ratio (SINR), wherein the information is obtained based on the first measurement result and one or more second measurement results received from one or more other terminal devices, and wherein the information, and wherein the target unlicensed frequency band meets the at least one of first conditions comprising: the RSRP of the target unlicensed frequency band is less than or equal to a first threshold, the RSRQ of the target unlicensed frequency band is less than or equal to a second threshold, or the SINR of the target unlicensed frequency band is less than or equal to a third threshold; and determining, based on the first measurement result, position information of the terminal device.

9. The method according to claim 8, wherein the determining, based on the first measurement result, position information of the terminal device comprises:

determining that the terminal device is located outdoors in response to determining that the first measurement result meets a second condition, wherein the second condition comprises one or more of the following conditions: the RSRP is less than or equal to a fifth threshold, the RSRQ is less than or equal to a sixth threshold, and the SINR is less than or equal to a seventh threshold; and determining that the terminal device is located indoors in response to determining that the first measurement result meets a third condition, wherein the third condition comprises one or more of the following conditions: the RSRP is greater than the fifth threshold, the RSRQ is greater than the sixth threshold, and the SINR is greater than the seventh threshold.

10. A communication apparatus, comprising:

a transceiver;

at least one processor; and at least one memory coupled to the at least one processor and storing programming instructions for execution by the at least one processor to cause the communication apparatus to perform operations comprising:

receiving, from at least two terminal devices, at least two measurement reports, wherein each of the at least two measurement reports comprises a measurement result of each to-be-measured unlicensed frequency band in one or more to-be-measured unlicensed frequency bands;

obtaining, based on measurement results comprised in the at least two measurement reports, information about a target unlicensed frequency band that meets at least one of first conditions in the one or more to-be-measured unlicensed frequency bands, wherein the information about the target unlicensed frequency band comprises at least one of reference signal received power (RSRP) of the target unlicensed frequency band, reference signal received quality (RSRQ) of the target unlicensed frequency band, or a signal to interference plus noise ratio (SINR) of the target unlicensed frequency band; and transmitting, based on the information about the target unlicensed frequency band, a signal on a supplementary uplink (SUL), wherein a spectrum of the SUL comprises the target unlicensed frequency band.

11. The communication apparatus according to claim 10, wherein the target unlicensed frequency band meets the at least one of first conditions comprising: the RSRP of the target unlicensed frequency band is less than or equal to a first threshold, the RSRQ of the target unlicensed frequency band is less than or equal to a second threshold, or the SINR of the target unlicensed frequency band is less than or equal to a third threshold.

12. The communication apparatus according to claim 11, wherein the measurement result of the each to-be-measured unlicensed frequency band comprises one or more of RSRP of the each to-be-measured unlicensed frequency band, RSRQ of the each to-be-measured unlicensed frequency band, and an SINR of the each to-be-measured unlicensed frequency band.

13. The communication apparatus according to claim 12, wherein a quantity of measurement results that meet the at least one of the first conditions is greater than or equal to a fourth threshold.

14. The communication apparatus according to claim 11, wherein the obtaining information about a target unlicensed frequency band comprises:

receiving, from a first terminal device, one or more measurement reports, wherein each of the one or more measurement reports comprises a measurement result of each to-be-measured unlicensed frequency band in one or more to-be-measured unlicensed frequency bands, and the measurement result of the each to-be-measured unlicensed frequency band comprises one or more of RSRP of the each to-be-measured unlicensed frequency band, RSRQ of the each to-be-measured unlicensed frequency band, and an SINR of the each to-be-measured unlicensed frequency band; and obtaining, based on the one or more measurement reports, the information about the target unlicensed frequency band that meets the at least one of the first conditions in the one or more to-be-measured unlicensed frequency bands, wherein the first terminal device belongs to a configured coordination group comprising at least two terminal devices.

15. The communication apparatus according to claim 14, wherein the operations further comprise:

receiving, from a second terminal device, a first measurement result; and determining, based on the first measurement result, position information of the second terminal device.

16. The communication apparatus according to claim 15, wherein the determining, based on the first measurement result, position information of the second terminal device comprises:

determining that the second terminal device is located outdoors in response to determining that the first measurement result meets a second condition, wherein the second condition comprises at least one of RSRP in the first measurement result is less than or equal to a fifth threshold, RSRQ in the first measurement result is less than or equal to a sixth threshold, and an SINR in the first measurement result is less than or equal to a seventh threshold; and determining that the second terminal device is located indoors in response to determining that the first measurement result meets a third condition, wherein the third condition comprises at least one of: the RSRP in the first measurement result is greater than the fifth threshold, the RSRQ in the first measurement result is greater than the sixth threshold, and the SINR in the first measurement result is greater than the seventh threshold.

* * * * *